(12) United States Patent
Baskin (10) Patent No.: US 11,618,557 B2
(45) Date of Patent: Apr. 4, 2023

(54) CENTRIFUGAL FORCE BEARING WITH PIEZO CLUTCH

(71) Applicant: Bell Textron Inc., Fort Worth, TX (US)

(72) Inventor: Bryan Kenneth Baskin, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 160 days.

(21) Appl. No.: 17/004,919

(22) Filed: Aug. 27, 2020

(65) Prior Publication Data

US 2022/0063797 A1 Mar. 3, 2022

(51) Int. Cl.
| | |
|---|---|
| *B64C 27/35* | (2006.01) |
| *B64C 27/52* | (2006.01) |
| *B64C 13/50* | (2006.01) |
| *B64C 29/00* | (2006.01) |
| *F16C 27/02* | (2006.01) |

(52) U.S. Cl.
CPC .............. *B64C 27/35* (2013.01); *B64C 13/50* (2013.01); *B64C 27/52* (2013.01); *B64C 29/0033* (2013.01); *F16C 27/02* (2013.01); *F16C 2326/43* (2013.01)

(58) Field of Classification Search
CPC ......... B64C 27/35; B64C 13/50; B64C 27/52; B64C 29/0033; F16C 27/02; F16C 2326/43
USPC ........................................................ 416/174
See application file for complete search history.

(56) References Cited

U.S. PATENT DOCUMENTS

| | | | | | |
|---|---|---|---|---|---|
| 4,515,486 | A | * | 5/1985 | Ide ........................... | F16C 17/06 384/119 |
| 5,054,938 | A | * | 10/1991 | Ide ......................... | F16C 33/805 384/119 |
| 5,102,236 | A | * | 4/1992 | Ide ......................... | F16C 17/035 384/103 |
| 5,125,754 | A | * | 6/1992 | Ide ........................... | F16C 25/02 384/122 |
| 5,304,006 | A | * | 4/1994 | Ide ......................... | F16C 17/065 384/117 |
| 6,582,125 | B1 | * | 6/2003 | Lee ........................... | F16C 25/02 384/106 |
| 9,242,636 | B2 | * | 1/2016 | Helmer ................... | F16D 28/00 |
| 2004/0040816 | A1 | * | 3/2004 | Reul ..................... | F16D 25/083 192/98 |
| 2005/0079055 | A1 | * | 4/2005 | Chemouni ............ | F16F 3/0873 416/134 A |

(Continued)

*Primary Examiner* — Logan M Kraft
*Assistant Examiner* — John D Bailey
(74) *Attorney, Agent, or Firm* — Fogarty LLP (57) ABSTRACT

An elastomeric bearing assembly has a centrifugal force bearing axially captured relative to a sliding interface. The sliding interface has one or more low friction regions and one or more high friction regions. One or more piezo actuators are configured to force one or more corresponding high friction regions against the centrifugal force bearing when actuated. The sliding interface may have a circular shape, wherein the one or more low friction regions and the one or more high friction regions are alternating concentric segments of the sliding interface. The one or more high friction regions are recessed on the sliding interface relative to the one or more low friction regions.

17 Claims, 9 Drawing Sheets

(56) References Cited

U.S. PATENT DOCUMENTS

| | | | |
|---|---|---|---|
| 2009/0175725 A1* | 7/2009 | Podgurski | B64C 27/35 |
| | | | 416/134 A |
| 2009/0178892 A1* | 7/2009 | Lamers | F16F 1/387 |
| | | | 188/267 |
| 2009/0274400 A1* | 11/2009 | Yamashita | F16F 15/023 |
| | | | 384/99 |
| 2010/0143141 A1* | 6/2010 | Muylaert | F16C 27/02 |
| | | | 384/127 |
| 2011/0214532 A1* | 9/2011 | Kirchner | F16D 28/00 |
| | | | 192/48.601 |
| 2013/0243597 A1* | 9/2013 | Perrin | B64C 27/35 |
| | | | 416/131 |
| 2014/0315682 A1* | 10/2014 | Helmer | B60K 6/387 |
| | | | 903/902 |
| 2015/0219076 A1* | 8/2015 | Wendeberg | F03D 80/88 |
| | | | 416/174 |
| 2015/0226186 A1* | 8/2015 | Mitsch | F16C 27/063 |
| | | | 416/134 R |
| 2017/0343041 A1* | 11/2017 | Vogt | F16C 17/024 |
| 2018/0128696 A1* | 5/2018 | Jiang | G01L 1/2287 |
| 2019/0097547 A1* | 3/2019 | Karasikov | H02N 2/103 |
| 2019/0277157 A1* | 9/2019 | Snow | F01D 3/04 |
| 2020/0232512 A1* | 7/2020 | Baskin | F16C 33/6659 |

\* cited by examiner

CENTRIFUGAL FORCE BEARING WITH PIEZO CLUTCH

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff, and landing (VTOL) aircraft do not require runways. Instead, VTOL aircraft are capable of taking off, hovering, and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. The range of rotor pitch varies in different operating conditions, such as during helicopter mode, airplane mode, and blade-fold mode, which creates varying loads on the centrifugal force and shear bearings in different operating modes. Existing blade-fold tiltrotors with centrifugal force bearings use a passive self-lubricated sliding interface to balance the torsional stiffness, coefficient of friction, centrifugal force, and pitch angle for all operating and wear conditions to arrive at a closed solution.

SUMMARY

Centrifugal force bearings in tiltrotor aircraft must twist through a large pitch range. On blade-fold tiltrotors, the centrifugal force bearings must twist even more. This torsion range typically requires a long centrifugal force bearing, which can be a stability challenge. Packaging a long bearing with the stop fold hardware presents a challenge as well. Existing blade-fold designs incorporate a sliding interface that allows the centrifugal force bearing to rotate by sliding instead of twisting the elastomer layers during blade stow operations thereby allowing for a shorter elastomer/shim stack. However, when considering all operating conditions, material options, and bearing sizing, the passive approach may not always be practical, and an actively controlled sliding interface may provide a better solution.

To accommodate very large torsion angles, an elastomeric centrifugal force bearing for a tiltrotor may incorporate a self-lubricated thrust bearing that allows torsion motion during fold and stow operations or when transitioning between VTOL and airplane mode pitch ranges. To ensure that bearing sliding only happens when desired, the friction coefficient of the sliding interface can be actively controlled via a piezoelectric clutch. Example embodiments are roughly analogous to disk and drum brakes. In a disc-type clutch assembly, the self-lubricated bearing surface is concentric with a high friction surface and a piezo actuator adjusts the percent of centrifugal force load carried by each surface. In a drum-type clutch assembly, the high friction surface is perpendicular to the self-lubricated bearing surface and a piezo actuator moves shoes into contact with sufficient force to lock out the sliding motion. Electrical power for the piezo actuators may be provided in the rotor system using existing power stop-fold or blade-fold hardware. Use of piezo actuation avoids bringing hydraulic power into the rotor head and integrates well into existing centrifugal force bearings.

Embodiments are directed to an elastomeric bearing assembly comprising a centrifugal force bearing axially captured relative to a sliding interface. The sliding interface has one or more low friction regions and one or more high friction regions. One or more piezo actuators are configured to force one or more corresponding high friction regions against the centrifugal force bearing when actuated. The sliding interface may have a circular shape, wherein the one or more low friction regions and the one or more high friction regions are alternating concentric segments of the sliding interface. The one or more high friction regions are recessed on the sliding interface relative to the one or more low friction regions. The sliding interface may comprise a polytetrafluoroethylene coating in the one or more low friction regions. The high friction regions may be configured to restrict rotation of the centrifugal force bearing when the one or more piezo actuators are actuated. The elastomeric bearing assembly may further comprise a spindle axially received through at least a portion of the centrifugal force bearing.

In another embodiment, an elastomeric bearing assembly comprises a centrifugal force bearing axially captured relative to a sliding interface. The centrifugal force bearing has a first end with a hollow region defined by an inner wall of the first end. One or more piezo actuators are disposed within the hollow region. One or more high friction elements are also disposed within the hollow region. Each of the high friction elements are positioned between one of the piezo actuators and the inner wall. The one or more piezo actuators are configured to force the one or more corresponding high friction elements against the inner wall when actuated. The sliding interface has a circular shape and is in contact with the first end of the centrifugal force bearing. The sliding interface may comprise a polytetrafluoroethylene coating in contact with the first end of the centrifugal force bearing. The high friction elements are configured to restrict rotation of the centrifugal force bearing when the one or more piezo actuators are actuated. The elastomeric bearing assembly further comprises a spindle axially received through at least a portion of the centrifugal force bearing.

In a further embodiment, a rotor assembly for a tiltrotor aircraft comprises a rotor hub, a spindle attached to the rotor hub and configured to attach a rotor blade to the rotor hub, and an elastomeric bearing assembly mounted axially on the spindle. The elastomeric bearing assembly comprises a centrifugal force bearing having a first end, a sliding interface having one or more low friction regions in contact with the first end of the centrifugal force bearing, one or more high friction elements, and one or more piezo actuators configured to force one or more corresponding high friction elements against the centrifugal force bearing when actuated.

The sliding interface may have a circular shape, and the one or more low friction regions and the one or more high friction elements may be alternating concentric segments of the sliding interface. The one or more high friction regions may be recessed on the sliding interface relative to the one or more low friction regions. The sliding interface may comprise a polytetrafluoroethylene coating in the one or more low friction regions. The polytetrafluoroethylene coating may be contact with the first end of the centrifugal force bearing. The high friction elements are configured to restrict rotation of the centrifugal force bearing when the one or more piezo actuators are actuated.

The rotor assembly further comprises a hollow region in the first end. The hollow region is defined by an inner wall of the first end. The one or more piezo actuators are disposed within the hollow region. The one or more high friction elements are also disposed within the hollow region. Each of the high friction elements are positioned between one of the piezo actuators and the inner wall. The one or more piezo actuators are configured to force the one or more corresponding high friction elements against the inner wall when actuated.

The rotor assembly may further comprise a flight control computer coupled to the one or more piezo actuators. The flight control computer may be configured to activate the one or more piezo actuators by applying an electrical signal to the one or more piezo actuators.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
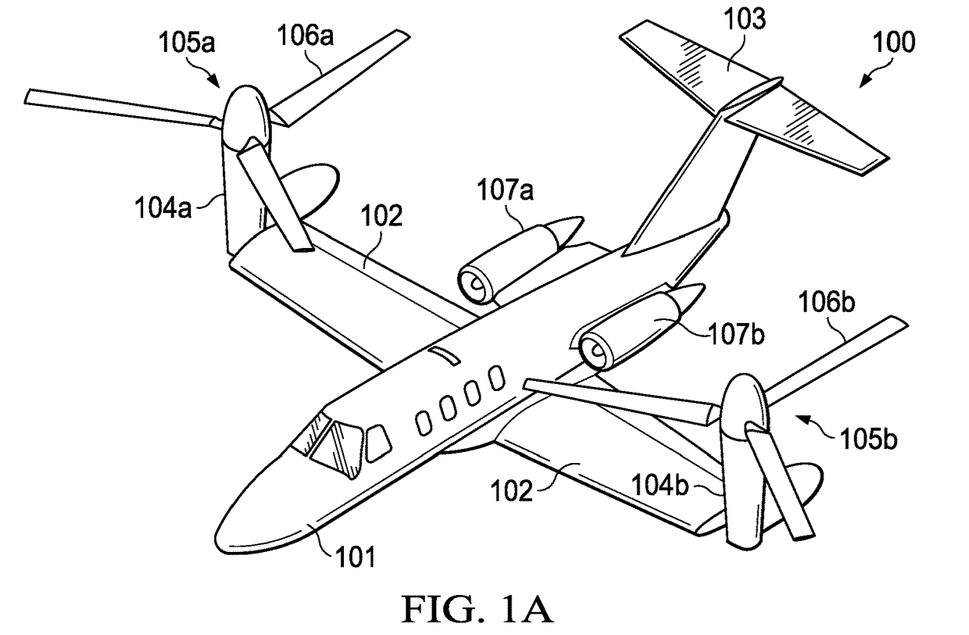
FIGS. 1A-1C illustrate a tiltrotor aircraft in various rotary and non-rotary flight modes.
Figure 1B:
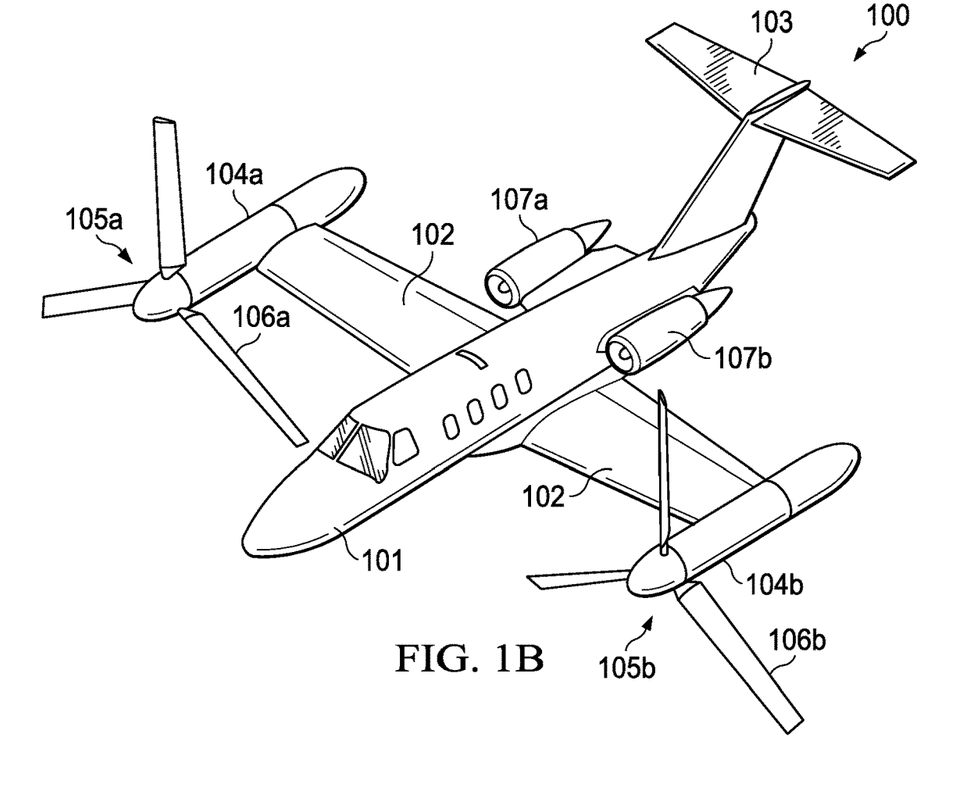
Figure 1C:
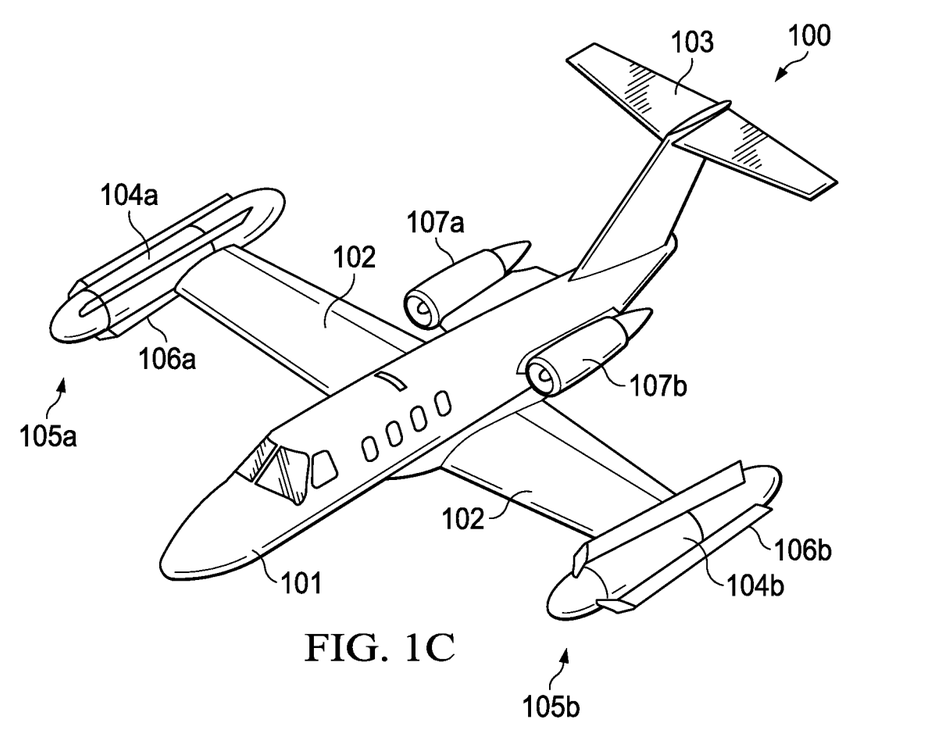

Referring to FIGS. 1A-1C, a tiltrotor aircraft is schematically illustrated and generally designated 100. Tiltrotor aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that tiltrotor aircraft 100 flies much like a conventional propeller driven aircraft.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 1-7b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106b, 106c during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. No. 8,998,125 B2, 10,336,447 B2, and 10,526,068 B2, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer may be incorporated into tiltrotor aircraft 100 and may be configured to control and communicate with various systems including, for example, proprotor blade control systems in proprotor assembly 105a, 105b. The proprotor blade control systems may be communicably coupled to the flight control computer and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide feedback data related to the controllable elements, and control computers that operate the actuators, for example, by transmitting control signals to the actuators. The flight control computer and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities.

Generally, each proprotor assembly 105a, 105b includes a mast driven by a power source, such as engine 107a, 107b. A proprotor assembly includes a yoke connected to the mast. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Rotor blades 106a, 106b indirectly connected to the yoke with bearings. The bearings are generally elastomeric bearings constructed from a rubber type material that absorbs vibration and provides for limited movement of the rotor blades relative to the yoke and drive mast. There may be inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other bearings. The bearings accommodate forces acting on the rotor blades thereby allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch.

Figure 2A:
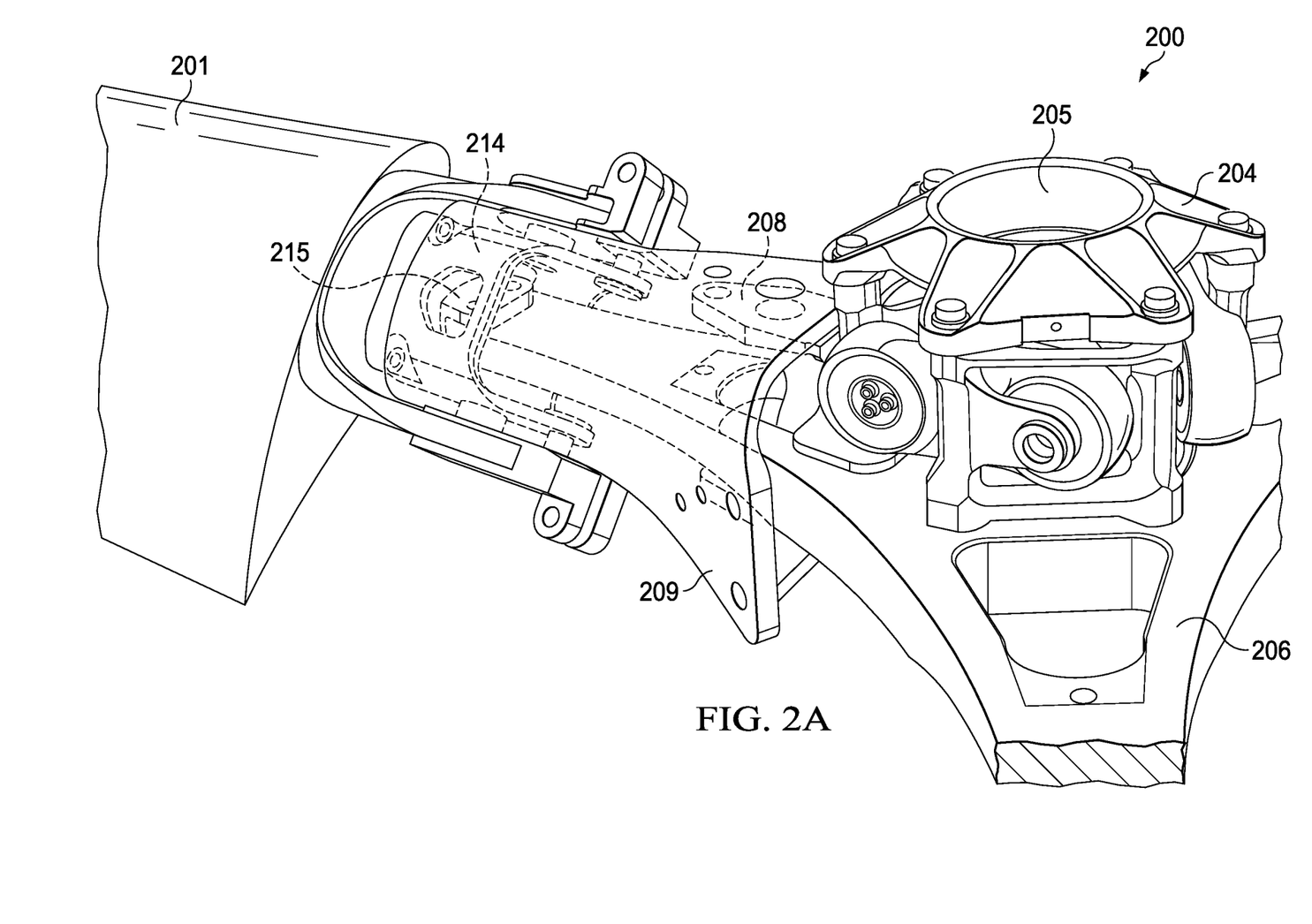
FIGS. 2A-2B illustrate proprotor assembly components in a rotor blade unfolded position.
Figure 2B:
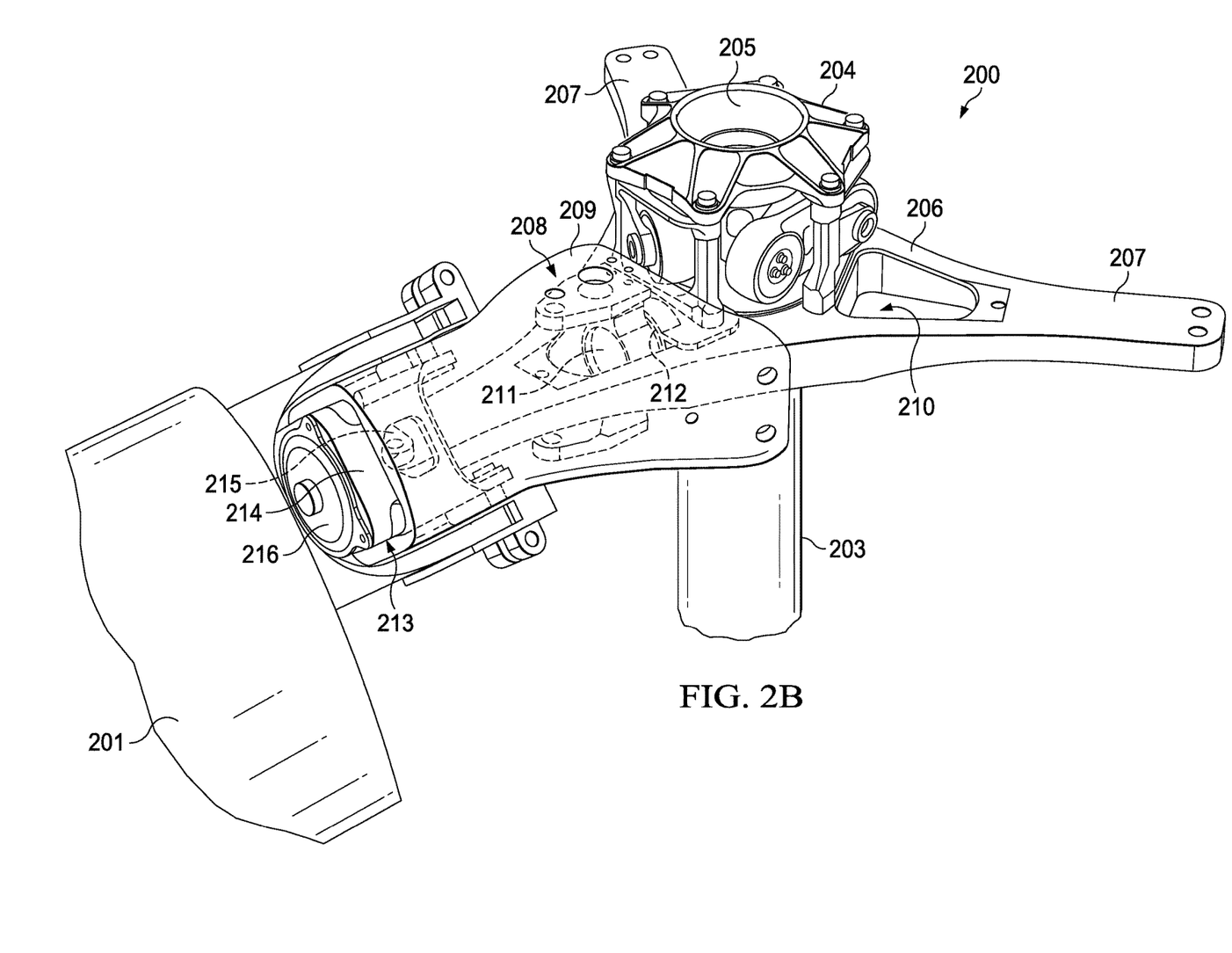

Referring to FIGS. 2A and 2B, a proprotor assembly 200 is shown in an unfolded position. In the interest of clarity, a single blade assembly is described herein with the understanding that tiltrotor aircraft 100 comprises a pair of similarly configured proprotor assemblies. In the unfolded position, each rotor blade 201 is generally equally spaced from each other around a mast. For example, in the three rotor blade configuration shown, 120° separates each rotor blade. It should also be appreciated that teachings regarding proprotor assembly 200 can apply to blade assemblies having greater or fewer rotor blades.

Mast 203 is connected to hub spring assembly 204 through central opening 205. Yoke 206 is mounted to hub spring assembly 204 through a central aperture axially aligned with central opening 205. Yoke 206 includes equally spaced arms 207 extending radially from the central aperture. A rotor blade 201 is connected to yoke 206 at each arm 213. In the interest of clarity, a single connection between a yoke arm 213 and a rotor blade 201 is described herein with the understanding that proprotor assembly 200 comprises a similarly configured connection for each rotor blade interface.

Inboard bearing assembly 208 connects yoke 206 to grip 209. Inboard bearing assembly 208 is positioned within opening 210 of yoke arm 207. Inboard bearing assembly 208 includes an inboard centrifugal force ("CF") bearing 211 and inboard shear bearing 212. Alternatively, an outboard bearing assembly 213 connects yoke arm 207 to grip 209. Outboard bearing assembly 213 includes outboard beam 214, spindle 215, and outboard CF bearing 216. In some embodiments, spindle 215 may be mounted to a tip of yoke arm 207. In other embodiments, spindle 215 may be mounted closer to the center of yoke 206, such as in opening 210. Accordingly, in various embodiments, inboard bearing assembly 208 and/or outboard shear bearing assembly 213 may react to centrifugal loads on spindle 215. Bearings 211, 212, and 216 may be, for example, elastomeric bearings that that permit feathering motions of blade 201 and accommodate cocking motion caused by flapping or lag in blade 201. The elastomeric bearings comprise a column of flat circular elastomer pads separated by rigid shims. In a tiltrotor aircraft CF bearing 211 twist through a large pitch range, such as 85 degrees, for example, while operating in normal helicopter and airplane modes. However, in a stop-fold tiltrotor aircraft the CF bearings must twist through an even larger range, such as on the order of 110 degrees, to permit folding of the rotor blades.

Figure 3:
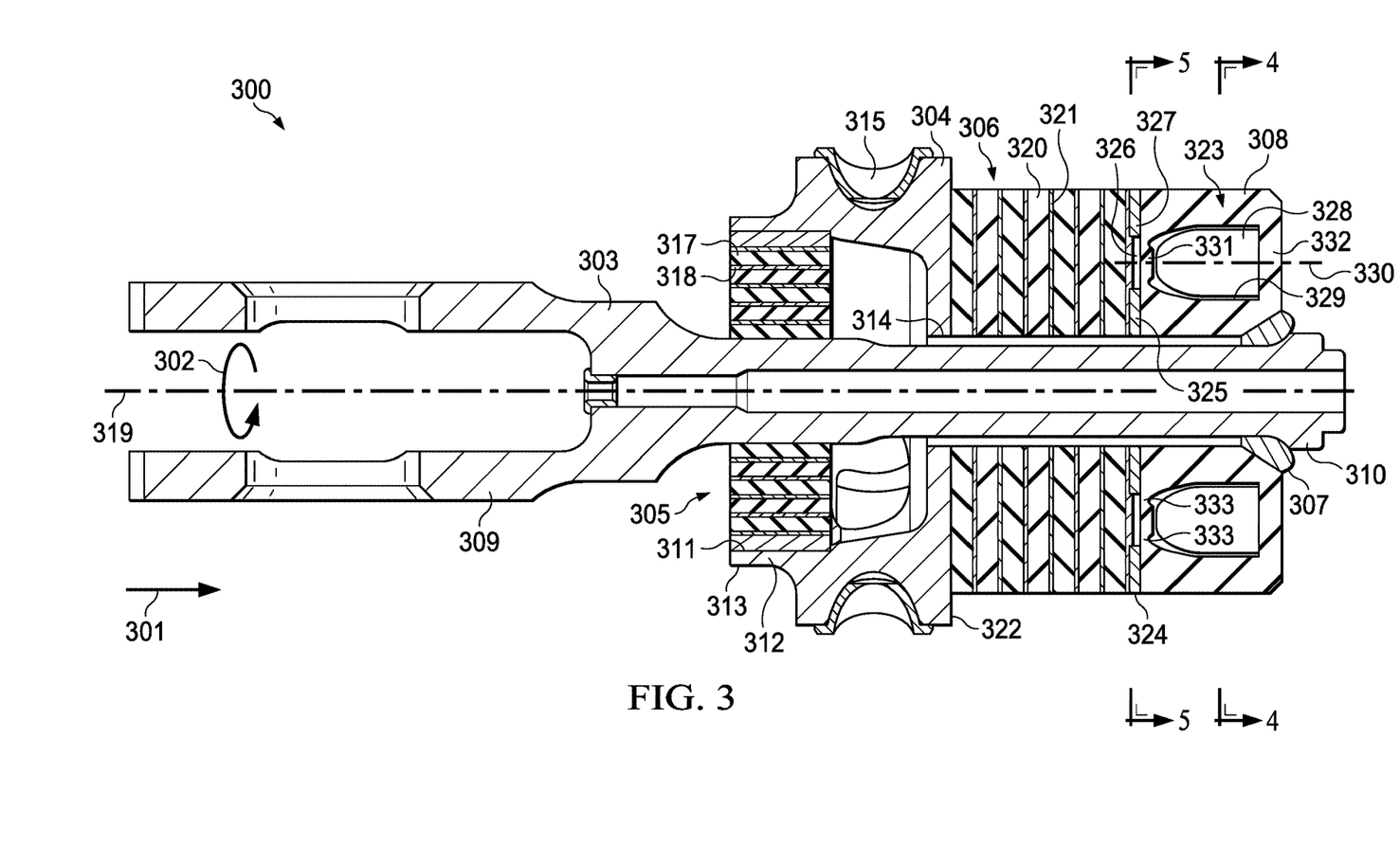
FIG. 3 is a cross section view of an elastomeric bearing assembly having a piezo actuated clutch assembly.

FIG. 3 is a cross section view of an elastomeric bearing assembly 300 for receiving and coupling to a rotor blade. Elastomeric bearing assembly 300 can be configured to treat and react a plurality of dynamic forces that act on the rotor blade, such as centrifugal force 301 and torsional force 302. Elastomeric bearing assembly 300 may include a spindle 303, a housing 304, a shear bearing 305, centrifugal force bearing 306, a cone set 307, and a cap 308. Spindle 303 can pass through the center of housing 304, shear bearing 305, centrifugal force bearing 306, and cap 308. Centrifugal force bearing 306 may be attached to the outboard end of housing 304 by being vulcanized or otherwise joined and held in place by cone set 307 and cap 308. The outboard portion 310 of spindle 303 can be rigidly coupled to cap 308.

Spindle 303 can be fabricated out of any suitable material. For example, spindle 303 can be forged, cast, or machined out of a suitable material such as stainless steel or titanium. The inboard portion 309 of spindle 303 can be attached to an arm 207 of yoke 206 so that elastomeric bearing assembly 300 extends beyond yoke 206. Alternatively, spindle 303 can be attached to yoke 206 in such a manner that elastomeric bearing assembly 300 is positioned in opening 210.

Housing 304 can be fabricated out of any suitable material. For example, housing 304 can be forged, cast, or machined out of a suitable material such as aluminum or titanium. On the inboard end of housing 304, a first cavity with interior wall portion 311 can accommodate shear bearing 305. The first cavity can have substantially the same diameter as the exterior diameter of shear bearing 305. A wall 312 may provide support for the first cavity and can also have an exterior wall portion 313 that can be of a similar shape as shear bearing 305. Wall 312 can be of a suitable thickness, depending on the size of shear bearing 305. On the outboard end of housing 304, a second cavity with interior wall portion 314 can accommodate outboard portion 310 of spindle 303 passing through housing 304. On the sides of housing 304, cavities 315 that are perpendicular to spindle 303, but parallel to each other, can accommodate bushings and blade bolts configured to couple a rotor blade grip to housing 304. Cavities 315 may be outboard of shear bearing 305 but inboard of centrifugal force bearing 306.

In one embodiment, shear bearing 305 is a cylindrical elastomeric bearing having multiple cylindrical layers that are laminated or vulcanized together. In another embodiment, shear bearing 305 may have conical or spherical layers that are laminated or vulcanized together. Shear bearing 305 can include alternating elastomeric layers 317 and rigid layers 318. Elastomeric layers 317 may be made of an elastic material such as rubber, and rigid layers 318 may be made of a rigid material such as steel. However, embodiments are not limited to any particular materials, and elastomeric layers 317 and rigid layers 318 may be made of any elastic and rigid materials, respectively.

Shear bearing 305 may be vulcanized or adhered to both the outboard portion 310 of spindle 303 and wall portion 311 of housing 304. Shear bearing 305 can be configured such that housing 304 is allowed to rotate clockwise and counterclockwise about a center axis 319 that runs along the length of each rotor blade and spindle 303. For example, shear bearing 305 reacts to torsional force 302 by elastically deforming the cylindrical elastomeric layers between each rigid layer. For example, as a pitch horn can selectively control the pitch of the rotor blade. As the pitch horn rotates the rotor blade, torsional force 302 is transferred from the rotor blade to housing 304, and from housing 304 to shear bearing 305. Accordingly, since spindle 303 is not rotatable, torsional force 302 is in relation to spindle 303.

In another embodiment, shear bearing 305 may be a spherical, self-lubricated bearing.

In one embodiment, centrifugal force bearing 306 is a cylindrical elastomeric bearing that has multiple substantially planar layers that are laminated or vulcanized together. In another embodiment, centrifugal force bearing 306 may additionally have conical or spherical layers that are laminated or vulcanized together. The planar layers may run perpendicularly in relation to the length of spindle 303. Centrifugal force bearing 306 may include alternating elastomeric layers 320 and rigid layers 321. Elastomeric layers 320 may be made of an elastic material such as rubber, and rigid layers 321 may be made of a rigid material such as steel. However, embodiments are not limited to any particular materials, and elastomeric layers and rigid layers may be made of any elastic and rigid materials, respectively.

Centrifugal force bearing 306 can be vulcanized, adhered, or fastened to surface 322 of housing 304. Centrifugal force bearing 306 can be configured to counteract centrifugal forces acting on the rotor blade as the blade spins with yoke 206. For example, centrifugal forces acting on the rotor blade are transferred to housing 304, and housing 304 then exerts a compression force to centrifugal force bearing 306. Centrifugal force bearing 306 reacts and counteracts the compression force by compressing the elastomeric layers between each rigid layer.

In the illustrated embodiment, centrifugal force bearing 306 is positioned about an outboard portion 310 of spindle 303 and is captured between housing 304 and cap 208. In this embodiment, the centrifugal force bearing 306 has a substantially cylindrical profile so that, in response to a torsional force 302, rotation of the centrifugal force bearing 306 about the center axis 319 is controlled by piezo clutch assembly 323. In some cases, centrifugal force bearing 306 can freely rotate when piezo clutch assembly 323 is disengaged, such as while the rotorcraft is not operating to spin the rotor system. In other cases, rotation of centrifugal force bearing 306 restricted by engaging piezo clutch assembly 323. By selectively allowing centrifugal force bearing 306 to rotate, the elastomeric components that otherwise carry the centrifugal force are relaxed and do not experience extended feathering torque and motion. Such relaxation of the elastomeric components of the centrifugal force bearing 306 can result in not only a longer lifespan, but can also permit a much more tailored, lightweight, and efficient design in the centrifugal force bearing 306 itself as it does not need to be sized to accommodate the extended feathering torque and motion.

Sliding interface 324 separates piezo clutch assembly 323 from centrifugal force bearing 306. In one embodiment, sliding interface 324 comprises three segments: an inner low friction zone 325, a high friction zone 326, and an outer low friction zone 327. Low friction zones 325 and 327 may be, for example, a low-friction surface coating or finish, such as, but not limited to, a polytetrafluoroethylene (PTFE) coating. High friction zone 326 is slightly recessed relative to low friction zones 325 and 327 so that in normal operation, when piezo clutch assembly 323 is not engaged, centrifugal force bearing 306 can freely rotate relative to cap 308 by sliding on low friction zones 325 and 327.

Piezo clutch assembly 323 comprises a piezo actuator 328 positioned within a cavity 329 of cap 308. Piezo actuator 328 converts electrical energy into linear motion. When an electrical signal is applied, piezo actuator 328 expands along axis 330 thereby applying forces against inner cap wall 331 and outer cap wall 332. The force generated by piezo actuator 328 against inner cap wall 331 is transferred to high friction zone 326 on interface 324. Inner cap wall 333 may be configured, such as using thinner wall sections 333, to allow or enhance deflection of wall 331 along axis 330. Deflection of inner cap wall 333 causes corresponding deflection of high friction zone 326, which then causes high friction zone 326 to contact centrifugal force bearing 306 thereby limiting or preventing rotation of centrifugal force bearing 306 relative to sliding interface 324. The linear expansion of piezo actuator 328 can be controlled by varying the electrical signal applied to piezo actuator 328. Increasing the linear expansion of piezo actuator 328 causes a corresponding increase in the friction applied to centrifugal force bearing 306 by high friction zone 326. The friction coefficient of the sliding interface 324 can be actively controlled via piezoelectric clutch assembly 323. Accordingly, the piezoelectric clutch assembly 323 can be used to ensure that sliding only happens when desired. Electrical signals may be applied to piezo actuator 328 via wires (not shown) that are routed through or along spindle 303. The wires may be coupled to a flight control computer, for example, that provides control of the piezoelectric clutch assembly 323 based upon current flight conditions.

Figure 4A:
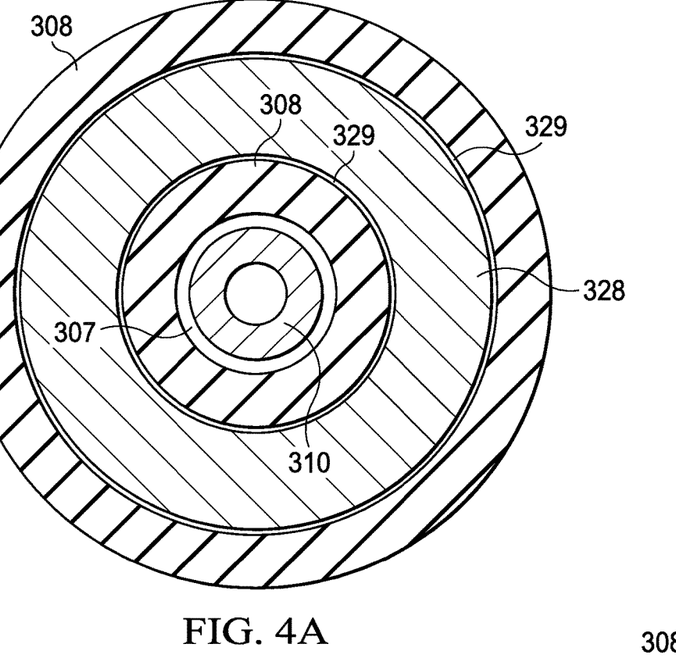
FIG. 4A is a cross section view illustrating one embodiment of a piezoelectric clutch assembly.

FIG. 4A is a cross section view of cap 308 illustrating one embodiment of piezoelectric clutch assembly 323. Piezo actuator 328 may have a generally annular or donut shape and may be disposed within an annular opening 329 in cap 308. This configuration would allow for uniform application of the clutch force against the sliding interface 324.

Figure 4B:
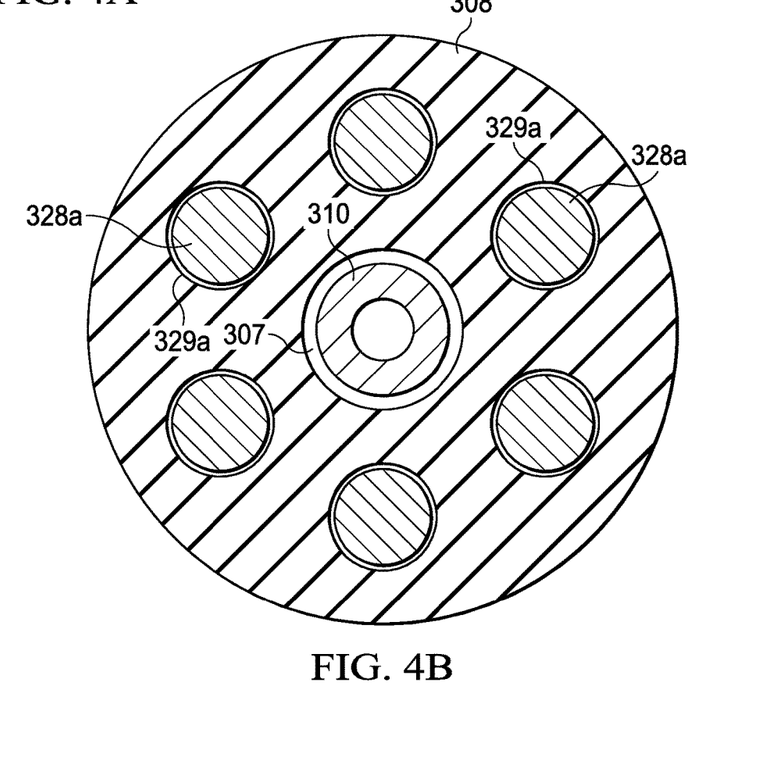
FIG. 4B is a cross section view illustrating another embodiment of a piezoelectric clutch assembly.

FIG. 4B is a cross section view of cap 308 illustrating another embodiment of piezoelectric clutch assembly 323. One or more individual piezo actuators 328a may be disposed within openings 329a in cap 308. Although six piezo actuators 328a are illustrated in FIG. 4b, it will be understood that the number and distribution of the individual piezo actuators 328 may vary for different applications. For example, the number and distribution of the individual piezo actuators 328a may be selected to provide uniform application of the clutch force against the sliding interface 324. Alternately, nonuniform clutch force may be applied as long as sufficient friction is provided to prevent rotation of centrifugal force bearing 306 when needed or desired. Each piezo actuator 328a may be activated individually so that none, one, some, or all of the piezo actuators 328a are operating at the same time, which would allow for selectable levels of friction to be applied to centrifugal force bearing 306.

Figure 5A:
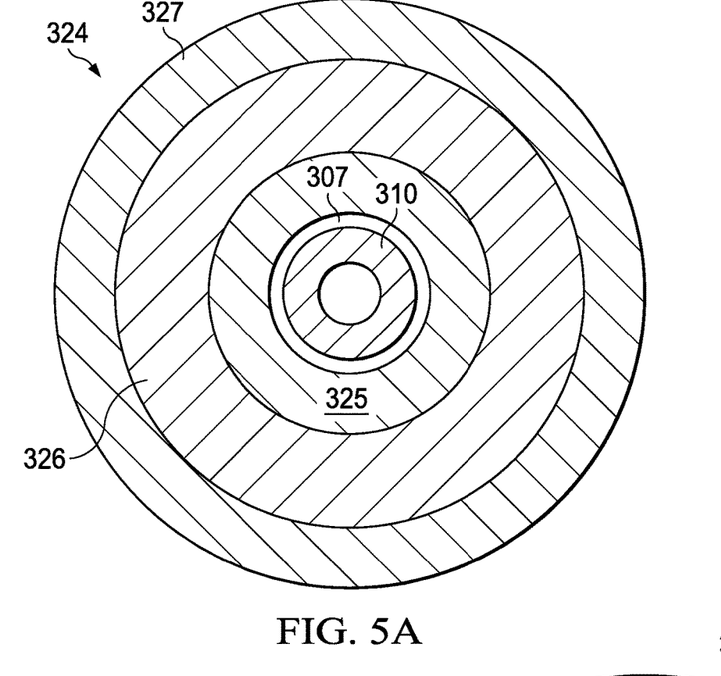
FIG. 5A illustrates an embodiment of a sliding interface for use with the piezoelectric clutch assembly embodiment shown in FIG. 4A.

FIG. 5A illustrates an embodiment of sliding interface 324 for use with the piezoelectric clutch assembly 323 shown in FIG. 4A. Inner low friction zone 325, high friction zone 326, and outer low friction zone 327 are concentric around outboard portion 310 of spindle 303. High friction zone 326 is slightly recessed relative to low friction zones 325 and 327 so that centrifugal force bearing 306 can move against sliding interface 324 with minimal friction unless piezo actuator 328 presses against high friction area 326 and brings it into contact with centrifugal force bearing 306.

Figure 5B:
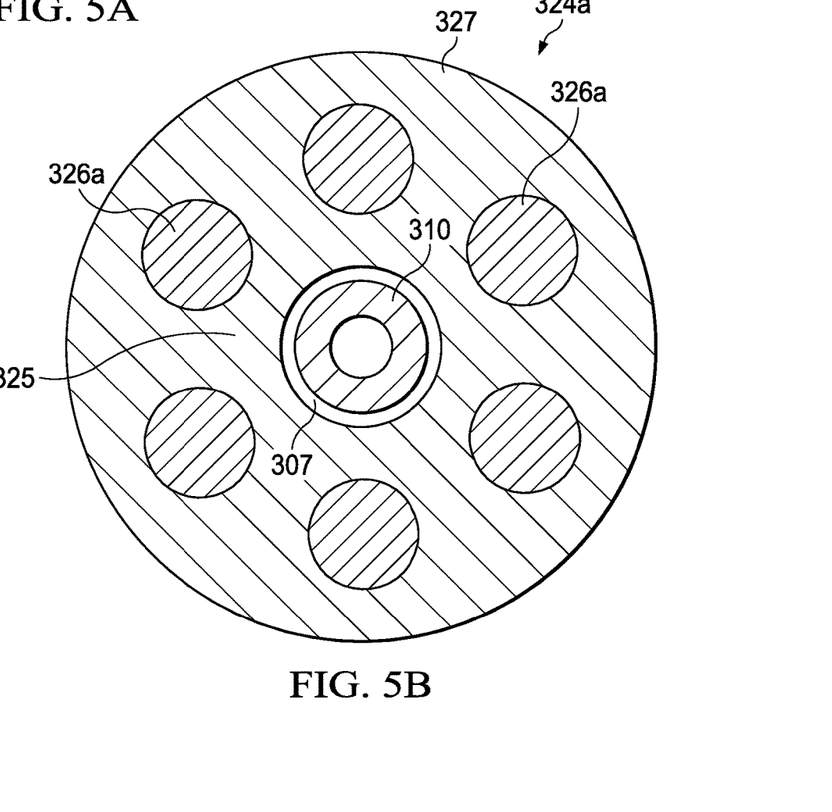
FIG. 5B illustrates an embodiment of a sliding interface for use with the piezoelectric clutch assembly embodiment shown in FIG. 4B.

FIG. 5B illustrates an embodiment of a sliding interface 324a for use with the piezoelectric clutch assembly 323 shown in FIG. 4B. Inner low friction zone 325 and outer low friction zone 327 provide most of the surface area around outboard portion 310 of spindle 303. One or more high friction zones 326a are positioned on sliding interface 324a to generally align with the individual piezo actuators 328a. The high friction zones 326a are slightly recessed relative to low friction zones 325 and 327 so that centrifugal force bearing 306 can move against sliding interface 324a with minimal friction unless one or more individual piezo actuators 328a press against a high friction area 326a and brings it into contact with centrifugal force bearing 306. Sliding interface 324a does not rotate relative to piezoelectric clutch assembly 323 so that high friction zones 326a remain generally aligned with individual piezo actuators 328a. Although the individual piezo actuators 328a and corresponding high friction zones 326a are shown as having a circular shape in FIGS. 4B and 5B, it will be understood that the piezo actuators 328a and corresponding high friction zones 326a may have any shape, dimension, and orientation as appropriate for a particular piezoelectric clutch assembly, rotor assembly, or aircraft.

FIGS. 3, 4A, and 4B illustrate piezo-actuator driven embodiments for disc-type clutch systems for a centrifugal force bearing. Other piezo-actuator driven embodiments are also possible. For example, FIG. 6 illustrates a drum-type clutch system for selectively locking out the sliding motion of a centrifugal force bearing.

Figure 6:
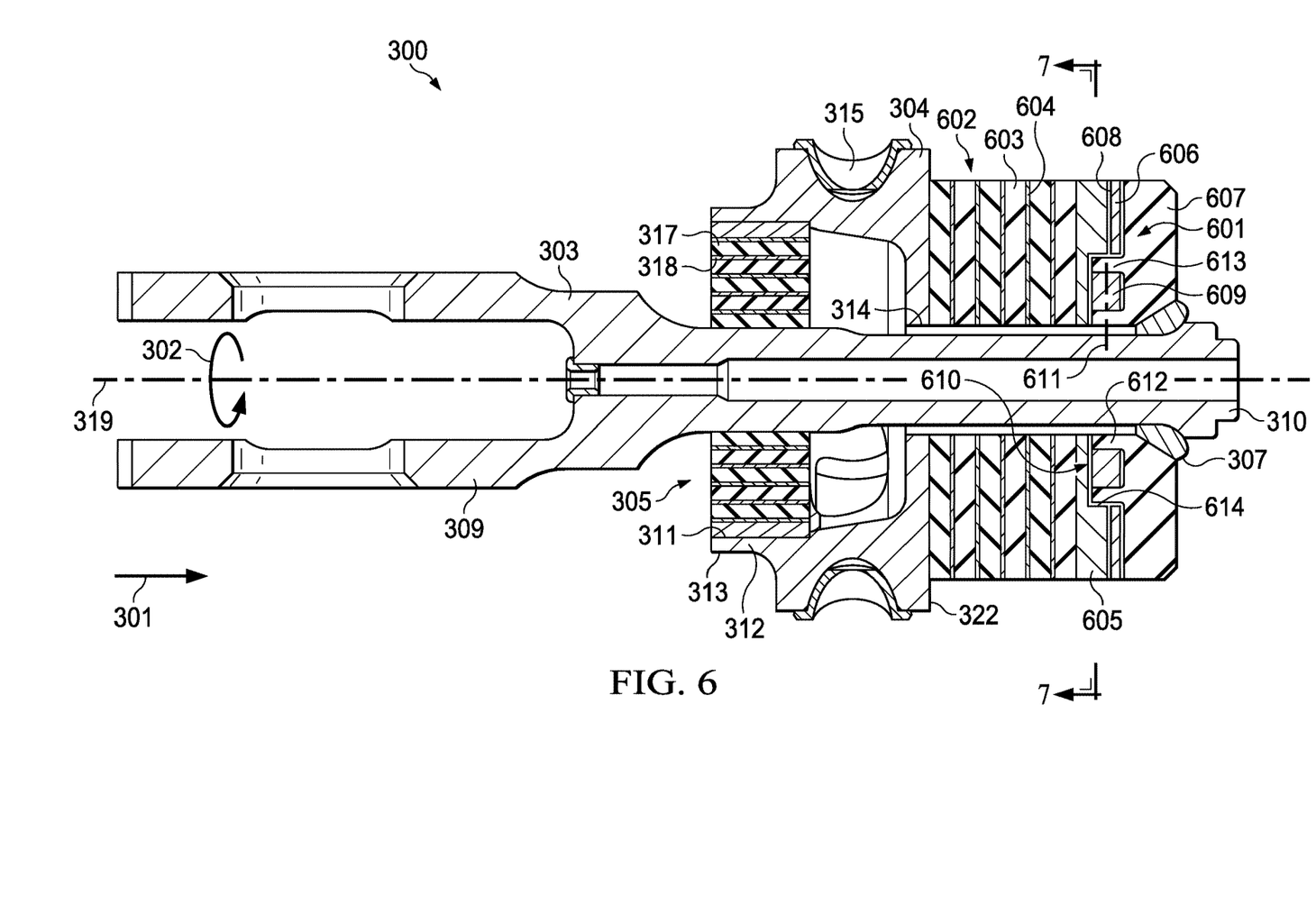
FIG. 6 is a cross section view of a further embodiment of a piezoelectric clutch assembly for an elastomeric bearing assembly.

FIG. 6 is a cross section view of an alternative elastomeric bearing assembly 600 for receiving and coupling to a rotor blade. Some components of elastomeric bearing assembly 600 are similar to those discussed above with respect to elastomeric bearing assembly 300 and are similarly labeled in FIG. 6. Elastomeric bearing assembly 600 uses a piezo clutch assembly 601 to control the sliding motion of centrifugal force bearing 602.

Centrifugal force bearing 602 is a cylindrical elastomeric bearing that has multiple substantially planar layers that are laminated or vulcanized together. Centrifugal force bearing 602 may include alternating elastomeric layers 603 and rigid layers 604. Elastomeric layers 603 may be made of an elastic material such as rubber, and rigid layers 604 may be made of a rigid material such as steel. However, embodiments are not limited to any particular materials, and elastomeric layers and rigid layers may be made of any elastic and rigid materials, respectively. Centrifugal force bearing 602 can be vulcanized, adhered, or fastened to surface 322 of housing 304.

End layer 605 of centrifugal force bearing 602 is in contact with sliding interface 606. The end layer 605 may be one of the rigid layers of centrifugal force bearing 602 or end layer 605 may be a different material. A cap 607 may hold the surface of sliding interface 606 against the end layer 605. Sliding interface 606 comprises a low friction surface 608, such as a low-friction surface coating or finish, such as, but not limited to, a PTFE coating. When allowed by piezo clutch assembly 601, end layer 605 of centrifugal force bearing 602 may slide or rotate relative to sliding interface 606.

Piezo clutch assembly 601 comprises one or more piezo actuators 609 positioned within a recessed area 610 of end layer 605. Each piezo actuator 609 converts electrical energy into linear motion. When an electrical signal is applied, piezo actuator 609 expands along axis 611 thereby applying forces against wall 612 and high friction shoe 613. The force generated by piezo actuator 609 causes high friction shoe 613 press against inner wall 614 of end layer 605. When high friction shoe 613 contacts end layer 605, friction between high friction shoe 613 and inner wall 614 limits or prevents rotation of centrifugal force bearing 602 relative to sliding interface 606. The linear expansion of piezo actuator 609 can be controlled by varying the electrical signal applied to piezo actuator 609.

Increasing the linear expansion of piezo actuator 609 causes a corresponding increase in the friction applied to centrifugal force bearing 602 by high friction shoe 613. Accordingly, piezoelectric clutch assembly 601 can be used to ensure that rotation of centrifugal force bearing 602 relative to sliding interface 606 happens only when desired. Electrical signals may be applied to piezo actuator 609 via wires (not shown) that are routed through or along spindle 303. The wires may be coupled to a flight control computer, for example, that provides control of the piezoelectric clutch assembly 601 based upon current flight conditions.

High friction shoe 613 may be an independent (i.e., floating) component or may be part of cap 607 or piezo actuator 609. For example, high friction shoe 613 may be attached to, or may be part of, cap 613. High friction shoe 613 may be configured to bend or flex into inner wall 614. In another embodiment, high friction shoe 613 may be directly attached to piezo actuator 609 so that high friction shoe 613 moves with piezo actuator 609.

Figure 7:
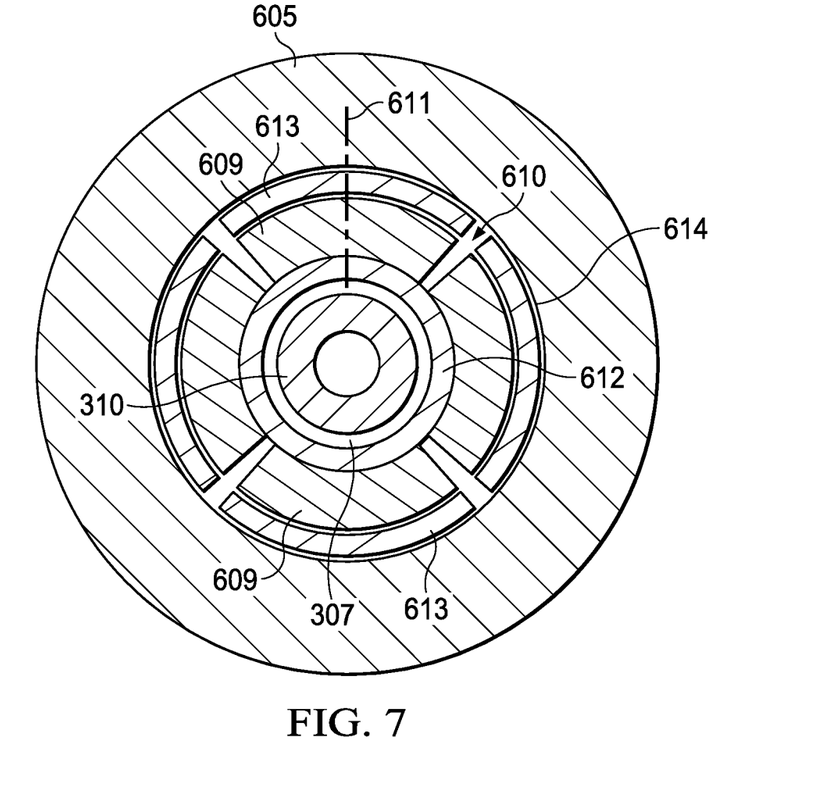
FIG. 7 is a cross section view of the centrifugal force bearing shown in FIG. 6.

FIG. 7 is a cross section view of end layer 605 of centrifugal force bearing 602. One or more piezo actuators 609 are disposed within recessed area 610 of end layer 605. A corresponding high friction shoe 613 is also provided in recessed area 610 for each piezo actuator 609. The high friction shoes 613 are positioned adjacent to inner wall 614 of the end layer 605. When an electrical signal is applied to a piezo actuator 609, the piezo actuator 609 expands along axis 611, which pushes the adjacent high friction shoe 613 against inner wall 614.

The linear expansion of piezo 609 can be controlled by varying the electrical signal applied to piezo actuator 609. Increasing the linear expansion of piezo actuator 609 causes a corresponding increase in the friction applied to inner wall 614 and end layer 605 by high friction shoe 613. The friction coefficient of the high friction shoe 613 can be actively controlled via piezoelectric clutch assembly 323. Accordingly, the piezoelectric clutch assembly 601 can be used to ensure that sliding only happens when desired Although four piezo actuators 609 are illustrated in FIG. 7, it will be understood that the number, shape, and position of the individual piezo actuators 609 may vary for different applications. For example, the number and distribution of the individual piezo actuators 609 and high friction shoes 613 may be selected to provide uniform application of the clutch force against the inner wall 614 and end layer 605. Alternately, nonuniform clutch force may be applied as long as sufficient friction is provided to prevent rotation of centrifugal force bearing 602 when needed or desired. Each piezo actuator 609 may be activated individually so that none, one, some, or all of the piezo actuators 609 are operating at the same time, which would allow for selectable levels of friction to be applied to centrifugal force bearing 602.

It will be understood that FIGS. 3-7 are simplified to illustrate the invention disclosed herein. The size, shape, orientation, and relative position of the piezo-actuated clutch systems, centrifugal force bearing layers, and other rotor system components illustrated in FIGS. 3-7 are not intended to limit embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An elastomeric bearing assembly, comprising:
   a centrifugal force bearing axially captured relative to a sliding interface pad, the sliding interface pad having one or more low friction regions and one or more high friction regions; and
   one or more piezo actuators configured to force one or more of the high friction regions against the centrifugal force bearing when actuated, wherein the high friction regions are configured to restrict rotation of the centrifugal force bearing when the one or more piezo actuators are actuated.

2. The elastomeric bearing assembly of claim 1, wherein the sliding interface pad has a circular shape, and wherein the one or more low friction regions and the one or more high friction regions are alternating concentric segments of the sliding interface pad.

3. The elastomeric bearing assembly of claim 1, wherein the one or more high friction regions are recessed on the sliding interface pad relative to the one or more low friction regions.

4. The elastomeric bearing assembly of claim 1, wherein the sliding interface pad comprises a polytetrafluoroethylene coating in the one or more low friction regions.

5. The elastomeric bearing assembly of claim 1, further comprising:
   a spindle axially received through at least a portion of the centrifugal force bearing.

6. An elastomeric bearing assembly, comprising:
   a centrifugal force bearing axially captured relative to a sliding interface, the centrifugal force bearing having a first end with a hollow region defined by an inner wall of the first end;
   one or more piezo actuators disposed within the hollow region;
   one or more high friction elements disposed within the hollow region, each of the high friction elements positioned between one of the piezo actuators and the inner wall; and
   wherein the one or more piezo actuators are configured to force the one or more corresponding high friction elements against the inner wall when actuated.

7. The elastomeric bearing assembly of claim 6, wherein the sliding interface has a circular shape, and wherein the sliding interface is in contact with the first end of the centrifugal force bearing.

8. The elastomeric bearing assembly of claim 6, wherein the sliding interface comprises a polytetrafluoroethylene coating in contact with the first end of the centrifugal force bearing.

9. The elastomeric bearing assembly of claim 6, wherein the high friction elements are configured to restrict rotation of the centrifugal force bearing when the one or more piezo actuators are actuated.

10. The elastomeric bearing assembly of claim 6, further comprising:
    a spindle axially received through at least a portion of the centrifugal force bearing.

11. A rotor assembly for a tiltrotor aircraft, comprising:
    a rotor hub;
    a spindle attached to the rotor hub and configured to attach a rotor blade to the rotor hub;
    an elastomeric bearing assembly mounted axially on the spindle, the elastomeric bearing assembly comprising:
      a centrifugal force bearing having a first end;
      a sliding interface pad having one or more low friction regions in contact with the first end of the centrifugal force bearing;
      one or more high friction elements; and
      one or more piezo actuators configured to force one or more of the high friction elements against the centrifugal force bearing when actuated, and wherein the high friction elements are configured to restrict rotation of the centrifugal force bearing when the one or more piezo actuators are actuated.

12. The rotor assembly of claim 11, wherein the sliding interface pad has a circular shape, and wherein the one or more low friction regions and the one or more high friction elements are alternating concentric segments of the sliding interface pad.

13. The rotor assembly of claim 11, wherein the one or more high friction regions are recessed on the sliding interface pad relative to the one or more low friction regions.

14. The rotor assembly of claim 11, wherein the sliding interface pad comprises a polytetrafluoroethylene coating in the one or more low friction regions.

15. The rotor assembly of claim 11, wherein the sliding interface pad comprises a polytetrafluoroethylene coating in contact with the first end of the centrifugal force bearing.

16. The rotor assembly of claim 11, further comprising:
    a hollow region in the first end, the hollow region defined by an inner wall of the first end, wherein the one or more piezo actuators are disposed within the hollow region;
    wherein the one or more high friction elements are disposed within the hollow region, each of the high friction elements positioned between one of the piezo actuators and the inner wall; and
    wherein the one or more piezo actuators are configured to force the one or more of the high friction elements against the inner wall when actuated.

17. The rotor assembly of claim 11, further comprising:
    a flight control computer coupled to the one or more piezo actuators, the flight control computer configured to activate the one or more piezo actuators by applying an electrical signal to the one or more piezo actuators.

\* \* \* \* \*